United States Patent [19]

Maeda et al.

[11] Patent Number: 4,882,192

[45] Date of Patent: Nov. 21, 1989

[54] HARD BUTTER COMPOSITION

[75] Inventors: Hirokazu Maeda, Sakai; Mayumi Yamaguchi, Izumisano; Tetsuya Uchiyama; Hideki Baba, both of Sennan; Hidenobu Matsunami, Sennan; Yoshitaka Ebihara, Yao; Junji Kanegae, Iwatsuki, all of Japan

[73] Assignee: Fuji Oil Company, Limited, Osaka, Japan

[21] Appl. No.: 176,181

[22] Filed: Mar. 31, 1988

[30] Foreign Application Priority Data

Apr. 3, 1987 [JP] Japan .................................. 62-83501

[51] Int. Cl.$^4$ ............................................. A23D 5/02
[52] U.S. Cl. ........................................ 426/607; 426/33
[58] Field of Search .................. 426/601, 603, 607, 33

[56] References Cited

U.S. PATENT DOCUMENTS

| 3,012,891 | 12/1961 | Best | 426/607 |
| 3,070,445 | 12/1962 | Sennema | 426/607 |
| 4,268,527 | 5/1981 | Matsuo et al. | 426/33 |
| 4,348,423 | 9/1982 | Pairaud et al. | 426/607 |
| 4,390,561 | 6/1983 | Blair | 426/603 |

FOREIGN PATENT DOCUMENTS

| 0186244 | 7/1986 | European Pat. Off. | 426/607 |
| 53-115863 | 10/1978 | Japan | 426/607 |
| 2003912 | 3/1979 | United Kingdom | 426/607 |

OTHER PUBLICATIONS

Lehninger, 1970, Biochemistry, Worth Publishers, Inc., p. 190.

Primary Examiner—Carolyn Paden
Attorney, Agent, or Firm—Wenderoth, Lind & Ponack

[57] ABSTRACT

A hard butter composition suitable for the production of solid chocolate having soft mouth feel at the beginning of mastication and sharp melting in the mouth, while it can provide sufficient shape retention at an ordinary temperature. The hard butter composition comprises at least 85% by weight of a triglyceride component mainly composed of triglycerides having one unsaturated bond in one molecule and triglycerides having at least three unsaturated bonds in one molecule, and at most 15% by weight of a nontriglyceride component based on the total weight of said composition. SFI of the composition is at most 65% at 5° C., 20 to 55% at 30° C., 2 to 35% at 35° C., at most 3% at 40° C., and difference between SFI at 5° C. and that of 25° C. being at most 15%.

1 Claim, No Drawings

HARD BUTTER COMPOSITION

FIELD OF THE INVENTION

The present invention relates to a hard butter composition. More particularly, the hard butter composition of the present invention has softness at a low temperature, while it has good heat resistance. Thereby, when the hard butter composition of the present invention is used in the production of, particularly, solid chocolate, it can provide soft mouth feel at the beginning of mastication and sharp melting in the mouth, while it can provide sufficient shape retention at ordinary temperature.

BACKGROUND OF THE INVENTION

As hard butters useful for cocoa butter substitutes, there have been known tempering type hard butters mainly composed of triglycerides having one unsaturated bond in one molecule (hereinafter referred to as U1) such as 2-oleo-1,3-dipalmitin (hereinafter referred to as POP), 2-oleo-1-palmito-3-stearin (hereinafter referred to as POSt), 2-oleo-1,3-distearin (hereinafter referred to as StOSt) and the like. Tempering type hard butters are very useful for the production of chocolate having mellow cocoa flavor wherein a large amount of cocoa butter is used, because such hard butters have good miscibility with cocoa butter and can be mixed with cocoa butter in any mixing ratio. Such tempering type hard butters can be prepared from natural fats containing a large amount of the above U1 component, or by appropriately compounding fractionated fats obtained from natural fats, ester-interchanged fats containing a large amount of U1 component obtained by an enzymatic ester interchange reaction and their fractionated fats. And, there have been made effort to imitate the triglyceride composition and properties of cocoa butter as close as possible. Accordingly, properties of tempering type hard butters are very similar to those of cocoa butter and the hard butters are hard at a low temperature and have good melting properties such that the butters are molten at about the body temperature, sharply. Thus, cocoa butter and tempering type hard butters have very good properties.

Nevertheless, from the practical viewpoint, they still have problems such as those in blooming resistance, tempering properties, migration of fats and oils when they are used as coating, and oil-off and cracking phenomena. In order to improve or solve these problems, various attempts have been done.

By the way, when chocolate made from a large amount of cocoa butter or a tempering type hard butter is coated on soft centers such as sponge cakes, mouth feel at a low temperature is deteriorated. Further, when it is used in the production of solid chocolate, mouth feel at the beginning of mastication is very hard. This hardness increases with time and it is not suitable for an aged person or a person having bad teeth.

Recently, it has been requested to improve or solve the above problems of cocoa butter and tempering type hard butters by taking into consideration of improvement of mouth feel at a low temperature as well as at the beginning of mastication. In view of this request, the present applicant (the assignee of the present application) has already proposed methods for preventing cracking, or improving tempering properties by admixing a liquid fat having a melting point of not higher than 25° C. with cocoa butter, a mixture of cocoa butter and a cocoa butter substitute, or a hard butter being rich in a 2-unsaturated-1,3-disaturated triglyceride component (Japanese Patent Kokai Nos. 59-135841, 60-27341 and 61-254143). Usually, cocoa butter or a hard butter in good quality has a high solid fat index (SFI) such as that at 5 to 25° C. of not lower than 70% and, therefore, it is very hard at a low temperature. When a liquid fat is admixed with cocoa butter or the hard butter, SFI at a low temperature is decreased and thereby it is possible to soften a product at a low temperature. However, SFI at a high temperature is also decreased and thereby heat resistance of the product is impaired. Accordingly, in the above present applicant's proposal, a small amount of a fat having a high melting point is added to improve heat resistance and this is effective to a certain degree.

The present inventors have further studied and have found that a hard butter composition having a specific glyceride composition and SFI has much improved properties than those of the compositions disclosed in the above present applicant's proposal.

OBJECTS OF THE INVENTION

The main object of the present invention is to provide a hard butter composition useful for a cocoa butter substitute having improved mouth feel at a low temperature and at the beginning of mastication as well as improved heat resistance.

This object as well as other objects and advantages of the present invention will become apparent to those skilled in the art from the following description.

SUMMARY OF THE INVENTION

According to the present invention, there is provided a hard butter composition which comprises at least 85% by weight of a triglyceride component and at most 15% by weight of a non-triglyceride component based on the total weight of said composition;

said triglyceride component containing (a) at most 5% by weight of tri-saturated glycerides, (b) 20 to 65% by weight of triglycerides having one unsaturated bond in one molecule, (c) at most 30% by weight of triglycerides having two unsaturated bonds in one molecule, and (d) 10 to 70% by weight of triglycerides having at least three unsaturated bonds in one molecule, based on the total amount of said triglyceride component;

said triglycerides having one unsaturated bonds in one molecule (b) containing (i) 50 to 95% by weight of 2-oleo-1,3-distearin, (ii) at most 20% by weight of 2-oleo-1-palmito-3-stearin, (iii) at most 30% by weight of 2-oleo-1,3-dipalmitin, and (iv) at most 20% by weight of 1,2-saturated-3-unsaturated glycerides, based on the total amount of said triglycerides (b);

said triglycerides having two unsaturated bonds in one molecule (c) containing at most 40% by weight of 1-stearo-2,3-diolein based on the total amount of said triglycerides (c); and SFI of said composition being at most 65% at 5° C., 20 to 55% at 30° C., 2 to 35% at 35° C., at most 3% at 40° C., and difference between SFI at 5° C. and that of 25° C. being at most 15%.

The hard butter composition of the present invention has good miscibility with cocoa butter and can be mixed with cocoa butter at any mixing ratio. Further, the hard butter composition of the present invention has softness at a low temperature, while it has good heat resistance. Thereby, even if the hard butter composition of the present invention is coated on soft centers such as sponge cakes, mouth feel at a low temperature is improved. Further, when the hard butter composition of the present invention is used in the production of, particularly, solid chocolate, it can provide soft mouth feel at the beginning of mastication and sharp melting in the mouth, and hardness of the product is little changed with time. Therefore, solid chocolate using the composition of the present invention is suitable for an aged person or a person having bad teeth.

DETAILED DESCRIPTION OF THE INVENTION

The hard butter composition of the present invention can substantially be composed of two kinds of triglycerides, i.e., triglycerides having one unsaturated bond in one molecule (U1) and triglycerides having at least three unsaturated bonds in one molecule (U3). When the composition contains 20 to 65% by weight of the U1 component and 10 to 70% by weight of the U3 component, it can be mixed with cocoa butter in any mixing ratio and can be subjected to a tempering treatment. However, the U1 component should contain 50 to 95% by weight of 2-oleo-1,3-distearin (StOSt). And, the content of 2-oleo-1-palmito-3-stearin (POSt) should be 20% by weight or less and that of 2-oleo-1,3-dipalmitin (POP) should be 30% by weight or less, otherwise it is difficult to improve heat resistance.

The hard butter composition of the present invention mainly composed of such U1 and U3 components can be prepared by appropriately compounding fractionated fats and oils which are obtained from natural fats and oils, or fats and oils subjected to an enzymatic selective ester interchange reaction; glycerides obtained by a suitable isolation technique; and liquid fats. Particularly, the composition can be readily prepared by utilizing fats and oils subjected to an enzymatic selective ester interchange reaction. That is, such fats and oils can be obtained by subjecting fats and oils in which oleic acid is bonded to 2-position of the triglyceride and free stearic acid, its ester, or fats and oils containing a large amount of stearic acid to an ester interchange reaction in the presence of an enzyme having selectivity to 1,3-positions of triglycerides such as lipase obtained from Rhizopus (e.g., *R. niveus, R. japonicus*, etc.), lipase obtained from Mucor (e.g., *M. javanicus*, etc.), lipase obtained from Asperigillus (e.g., *A. nigar*, etc.) or the like. Such enzymatic selective ester interchange reaction can be carried out according to a known method, for example, those disclosed in Japanese Patent Kokai No. 551-7179, U.S. Patent No. 4,416,991 and the like.

In practice, in addition to the above U1 and U3 components, other glyceride components are contained as impurities in the hard butter composition of the present invention. In this respect, the content of triglycerides having two unsaturated bonds in one molecule (U2) should be 30% by weight or lower based on the total amount of triglycerides. Particularly, the content of 1-stearo-2,3-diolein (StOO) should be 40% by weight o lower based on the total amount of the U2 component. Usually, it is said that, in comparison with glyceride components other than U1 component, StOO component contained in a triglyceride composition of cocoa butter or a hard butter does not adversely affect qualities of a hard butter such as tempering properties (Japanese Patent Kokai No. 61-242543). However, in the present invention, it is desired that the content of StOO should be as low as possible. When the content of StOO exceeds the above upper limit, mouth feel at the beginning of mastication at a low temperature is hard. Although this reason can not be clearly explained, it is presumed that, since crystallization of StOO component is taken place by standing it at about 20° C., the component which has not ben crystallized in a tempering step is crystallized with time to harden a chocolate product at a low temperature.

In addition, the content of tri-satuarted-glycerides (U0) is preferably 5% by weight or lower based on the total amount of triglycerides. When it exceeds 5% by weight, melting properties in the mouth are deteriorated. Further, the content of triglycerides having at least three unsaturated bonds in one molecule (U3) should be 10 to 70% by weight based on the total amount of triglycerides. When the content of U3 component is less than 10% by weight, it is difficult to provide soft mouth feel at the beginning of mastication and desired softness. On the other hand, when the content is more than 70% by weight, it is difficult to provide desired heat resistance.

As described above, the hard butter composition of the present invention contains at least 85% by weight of the triglyceride component composed of the specific amounts of U0, U1, U2 and U3 components. A non-triglyceride component such as monoglycerides, diglycerides, unsaponifiable materials and the like may be contained 15% by weight or lower based on the total amount of the composition. However, apparently, it is desirable that the content of such a triglyceride component is as low as possible.

The hard butter composition of the present invention has SFI (determined after allowing to stand its sample at 20° C. for 1 week, at 25° C. for 1 week and at 0° C. for 1 day to stabilize the sample) of at most 65% at 5° C., 20 to 55% at 30° C., 2 to 35% at 35° C. and at most 3% at 40° C., and the difference between SFI at 5° C. and that at 25° C. is at most 15%.

Usually, as described above, SFI of cocoa butter and a hard butter having good melting properties is 70% or higher at 5 to 25° C. and the difference between SFI at 5° C. and that at 25° C. is little. When a temperature becomes higher than 25° C., SFI is rapidly dropped and a curve obtained by plotting SFI against temperature shows a shoulder at about 25° C. When a liquid oil is added to this, SFI is lowered but the difference between SFI at 5° C. and that at 25° C. is great. Thus, the shoulder is disappeared and a gentle curve is formed. Particularly, in a high temperature range at more than 30° C., SFI becomes low, which results in loss of heat resistance.

However, in the hard butter composition of the present invention, the difference between 5° C. and 25° C. is little and a shoulder is appeared in a curve obtained by plotting SFI against temperature. This curve is similar to that of the above cocoa butter or a conventional hard butter but is shifted toward a low SFI part.

The following Examples, Comparative Examples and Reference Examples further illustrate the present invention in detail but are not to be construed to limit the scope thereof.

In these Examples, Comparative Examples and Reference Examples, all "%'s" and "parts" are by weight unless otherwise stated.

EXAMPLES 1 TO 3 AND COMPARATIVE EXAMPLES 1 TO 5

(1) Preparation of sample oil-1 (enzymatical ester-interchanged oil)

A mixture (1,000 parts) of equal amounts of high oleic sunflower oil and commercially available stearic acid was admixed with hexane (4000 parts) and powder diatomaceous earth (50 parts) which had adsorbed lipase of Rhizopus niveus (17 parts) was dispersed in the mixture. The resulting mixture was reacted with stirring at a rate of 200 r.p.m. at 40° C. for 72 hours. After completion of the reaction, the enzyme was filtered off from the reaction system and the solvent was removed from the filtrate. Steam was blown through the resulting ester interchanged reaction mixture to heat to 170° C. and free fatty acids were removed by steam distillation under reduced pressure to obtain the reaction product (475 parts). Then, n-hexane (400 parts) was added to the reaction product (100 parts) and the mixture was dissolved with warming. Then, according to a conventional method, the mixture was cooled with stirring to −5° C. and the deposited crystalline part was filtered off to obtain a mid fraction (yield: 30.2%).

(2) Preparation of sample oil-2 (ethanol-treated oil of shea butter)

According to the method disclosed in Japanese Patent Kokoku No. 54-288454, deacidified shea fat (1,000 parts) having the iodine value of 61.8 was mixed with modified ethanol (4,000 parts) and the mixture was stirred at 120° C. for 10 minutes. After standing for 20 minutes, the insoluble part in ethanol was removed and the mixture was cooled to 40° C. The lower oil layer was separated and the solvent was removed to obtain an ethanol-treated oil having iodine value of 55.2.

(3) Preparation of sample oil-3 (shea butter fractionated oil)

n-Hexane (400 parts) was added to the ethanol-treated oil (100 parts) having iodine value of 55.2 and the mixture was dissolved with warming. Then, according to a conventional method, the mixture was cooled with stirring to −20° C. and the deposited crystalline part was filtered to obtained a mid-fraction (yield: 52.6%).

Example 1: Sample oil-1 (40 parts) and high oleic sunflower oil (60 parts) were mixed and the mixture was refined according to a conventional method to obtain the desired hard butter composition.

Example 2: Sample oil-3 (50 parts) and palm fractionated soft oil (50 parts) having iodine value of 56.8 were mixed and the mixture was refined to obtain the desired hard butter composition.

Example 3: Sample oil-3 (25 parts) and rapeseed hardened oil (75 parts) having iodine value of 90.2 and the mixture was refined to obtain the desired hard butter composition.

Comparative Example 1: Sample oil-3 (15 parts) and high oleic sunflower oil (85 parts) were mixed and the mixture was refined to obtain a hard butter composition.

Comparative Example 2: Sample oil-1 (35 parts) and palm fractionated soft oil (65 parts) having iodine value of 56.8 were mixed and the mixture was refined to obtain a hard butter composition.

Comparative Example 3: Sample oil-3 (50 parts) and palm mid-fraction (50 parts) having iodine value of 33.9 were mixed and the mixture was refined to obtain a hard butter composition.

Comparative Example 4: Brazilian cocoa butter (80 parts) and high oleic sunflower oil (20 parts) were mixed and the mixture was refined to obtain a hard butter composition.

Comparative Example 5: Refined fat of sample-oil 2.

The glyceride compositions of the hard butter compositions obtained in Examples and Comparative Examples are shown in Table 1.

TABLE 1

| Ex. or Comp. Ex. No. | Ex. 1 | Ex. 2 | Ex. 3 | Comp. Ex. 1 |
|---|---|---|---|---|
| Iodine value | 66.2 | 46.6 | 76.7 | 66.2 |
| U0 | 0.8 | 1.1 | 1.7 | 0.4 |
| U1 | 30.8 | 58.7 | 23.4 | 12.8 |
| Triglycerides in U1 | | | | |
| StOSt | 77.3 | 56.4 | 70.9 | 78.9 |
| POSt | 15.6 | 11.2 | 9.8 | 10.9 |
| POP | 2.9 | 26.4 | 2.1 | 3.1 |
| SSU | 2.6 | 3.9 | 12.8 | 3.1 |
| Others | 1.6 | 2.1 | 4.4 | 4.0 |
| U2 | 17.6 | 28.3 | 18.4 | 17.0 |
| Triglycerides in U2 | | | | |
| StOO | 34.7 | 19.1 | 15.8 | 9.7 |
| Others | 65.3 | 80.9 | 84.2 | 90.3 |
| U3 | 50.8 | 13.0 | 56.5 | 70.0 |
| Non-triglycerides component | 2.4 | 5.2 | 3.3 | 2.6 |
| SFI (%) | | | | |
| 5° C. | 49.2 | 57.3 | 37.5 | 13.6 |
| 10° C. | 48.8 | 56.1 | 37.2 | 13.1 |
| 15° C. | 48.2 | 53.3 | 36.9 | 12.8 |
| 20° C. | 47.2 | 48.1 | 34.2 | 12.6 |
| 25° C. | 46.6 | 44.9 | 32.4 | 10.1 |
| 30° C. | 24.2 | 38.0 | 23.2 | 7.8 |
| 35° C. | 3.2 | 13.1 | 2.6 | 1.2 |
| 40° C. | 0 | 0.2 | 0 | 0 |
| 5–25° C. | 2.6 | 12.4 | 5.1 | 3.5 |

| Ex. or Comp. Ex. No. | Comp. Ex. 2 | Comp. Ex. 3 | Comp. Ex. 4 | Comp. Ex. 5 |
|---|---|---|---|---|
| Iodine value | 48.9 | 35.0 | 44.7 | 55.2 |
| U0 | 1.1 | 2.3 | 1.3 | 1.1 |
| U1 | 51.7 | 79.1 | 65.3 | 45.8 |
| Triglycerides in U1 | | | | |
| StOSt | 40.8 | 42.4 | 30.3 | 76.6 |
| POSt | 13.9 | 13.3 | 44.4 | 12.7 |
| POP | 38.3 | 39.4 | 21.1 | 3.3 |
| SSU | 4.6 | 3.2 | 1.5 | 2.8 |
| Others | 2.4 | 1.7 | 2.7 | 4.6 |
| U2 | 31.0 | 15.9 | 13.7 | 36.8 |
| Triglycerides in U2 | | | | |
| StOO | 21.6 | 27.7 | 33.5 | 71.7 |
| Others | 78.4 | 72.3 | 66.5 | 28.3 |
| U3 | 16.7 | 3.2 | 16.4 | 16.3 |
| Non-triglycerides component | 4.6 | 2.7 | 2.6 | 11.9 |
| SFI (%) | | | | |
| 5° C. | 54.2 | 82.6 | 67.2 | 57.6 |
| 10° C. | 49.2 | 82.5 | 65.4 | 54.2 |
| 15° C. | 45.2 | 81.2 | 63.2 | 48.3 |
| 20° C. | 39.6 | 78.6 | 60.2 | 41.2 |
| 25° C. | 35.4 | 72.7 | 55.6 | 40.0 |
| 30° C. | 19.8 | 57.2 | 42.7 | 35.4 |
| 35° C. | 4.2 | 4.9 | 0.6 | 12.4 |
| 40° C. | 0 | 0 | 0 | 1.2 |
| 5–25° C. | 18.8 | 9.9 | 11.6 | 17.6 |

REFERENCE EXAMPLES 1 TO 6

By using the hard butter composition of the above Example or Comparative Example, milk chocolate was prepared according to the following formulation.

| Milk chocolate formulation | |
|---|---|
| Ingredients | Parts |
| Cacao mass | 13 |
| Hard butter composition | 33 |
| Powdered sugar | 41 |
| Whole milk powder | 13 |
| Lecithin | 0.3 |
| Flavor | q.p. |

According to a conventional method, these ingredients were mixed and the mixture was subjected to refining, conching and tempering to obtain solid chocolate. Hardness of the resulting chocolate was determined at 10° C. with a cone penetrometer (a larger value represents a softer product), and at 30° C. with a rheometer (a larger value represents a harder product). The results are shown in Table 2.

TABLE 2

| Ref. Ex No. | Compositions | Hardness | |
|---|---|---|---|
| | | 10° C.* | 30° C.** |
| 1 | Example 1 | 4.2 | 120 |
| 2 | Example 2 | 2.7 | 110 |
| 3 | Comparative Example 2 | 3.8 | 60 |
| 4 | Comparative Example 3 | 1.6 | 122 |
| 5 | Comparative Example 4 | 1.8 | 105 |
| 6 | Comparative Example 5 | 1.9 | 55 |

*cone penetrometer value: The depth of penetration (mm) when the cone was dropped from 36 mm in height.
**rheometer value: g/0.785 cm²
The determination was carried out after standing the chocolate at 20° C. for 1 week and then at the respective temperature for 2 hours.

As seen from Table 2, when the chocolate using the composition of Example 1 or 2 (the composition of the present invention) was compared with that using the composition of Comparative Example 3 (having high U1 content and melting properties closely resemble to those of cocoa butter), the former had heat resistance and soft mouth feel at the beginning of mastication, whereas the latter had heat resistance with very hard mouth feel at the beginning of mastication. Although the chocolate using the composition of Comparative Example 2 (having low StOSt content, i.e., 40.8% and high POP content, i.e., 38.3% in U2 component as well as high U2 content, i.e., 31%) was soft at a low temperature and had soft mouth feel at the beginning of mastication, it was still soft at a high temperature and had no heat resistance. The chocolate using the composition of Comparative Example 4 (having somewhat high U1 content, low StOSt content, high POSt content and high SFI at 5° C.) was hard mouth feel at the beginning of mastication.

When sponge cakes were coated with each chocolate, mouth feel at 10° C. of the products using the compositions of Comparative Examples 3 to 5 were hard and were not harmonized with cakes. On the other hand, the products using the composition of Examples 1 and 2 and Comparative Example 2 had good mouth feel. However, the product using Comparative Example 2 stuck to the fingers and had no heat resistance.

REFERENCE EXAMPLES 7 AND 8

By using the composition of the above Example or Comparative Example, sweet chocolate was prepared according to the following formulation.

| Sweet chocolate formulation | |
|---|---|
| Ingredients | Parts |
| Cacao mass | 35 |
| Hard butter composition | 20 |
| Powdered sugar | 45 |
| Lecithin | 0.5 |
| Flavor | q.p. |

According to the conventional method, the ingredients were mixed and the mixture was subjected to refining, conching and tempering to obtain solid chocolate. Hardness of chocolate was determined according to the same manner as described above. The results are shown in Table 3.

TABLE 3

| Ref. Ex No. | Compositions | Hardness | |
|---|---|---|---|
| | | 10° C. | 30° C. |
| 7 | Example 3 | 3.0 | 150 |
| 8 | Comparative Example 1 | 2.1 | 75 |

As seen from Table 3, in comparison with the chocolate using the composition of Example 3 (the composition of the present invention having U1 content of 23.1%), although the chocolate using the composition of Comparative Example 1 (having low U1 content such as about 13% had soft at a low temperature and soft mouth feel at the beginning of mastication, it was still soft at a high temperature and had no heat resistance.

What is claimed is:

1. A hard butter composition which comprises at least 85% by weight of a triglyceride component and at most 15% by weight of a non-triglyceride component based on the total weight of said composition;
said triglyceride component containing
  (a) at most 5% by weight of tri-saturated glycerides,
  (b) 20 to 65% by weight of triglycerides having one unsaturated bond in one molecule,
  (c) at most 30% by weight of triglycerides having two unsaturated bonds in one molecule, and
  (d) 10 to 70% by weight of triglycerides having at least three unsaturated bonds in one molecule, based on the total amount of said triglyceride component;
said triglycerides having one unsaturated bond in one molecule (b) containing
  (i) 50 to 95% by weight of 2-oleo-1,3-distearin,
  (ii) at most 20% by weight of 2-oleo-1-palmito-3-stearin,
  (iii) at most 30% by weight of 2-oleo-1,3-dipalmitin, and
  (iv) at most 20% by weight of 1,2-saturated-3-unsaturated glycerides, based on the total amount of said triglycerides (b);
said triglycerides having two unsaturated bonds in one molecule (c) containing at most 40% by weight of 1-stearo-2,3-diolein based on the total amount of said triglycerides (c); and
SFI of said composition being
at most 65% at 5° C.,
20 to 55% at 30° C.,
2 to 35% at 35° C.,
at most 3% at 40° C., and
difference between SFI at 5° C. and that of 25° C. being at most 15%.

* * * * *